April 19, 1960   TOSHIO TANIYAMA ET AL   2,933,219
FEEDERS OF PULVERIZED COAL

Filed June 18, 1958   2 Sheets-Sheet 1

April 19, 1960  TOSHIO TANIYAMA ET AL  2,933,219
FEEDERS OF PULVERIZED COAL

Filed June 18, 1958  2 Sheets-Sheet 2

United States Patent Office 2,933,219
Patented Apr. 19, 1960

2,933,219

FEEDERS OF PULVERIZED COAL

Toshio Taniyama and Yoshiichi Karato, Niihama-shi, and Teruyoshi Usamoto, Akita-shi, Japan, assignors to Sumitomo Chemical Company, Ltd., Osaka, Japan, a corporation of Japan Application June 18, 1958, Serial No. 742,921

2 Claims. (Cl. 222—227)

This invention relates to an apparatus for obtaining uniform flow of pulverized coal. More particularly, it relates to improvement of table feeders.

In case of feeding to powdered substance, reaction apparatus, mixing apparatus, and so on, one of the problems to be considered in use of hitherto known devices lay in the pulsative or irregular fluctuations in feeding speed. In general industrial operations, such fluctuations in feeding speed of powdered substance, arising from the use of a screw feeder or a table feeder, may in some cases be allowable within a certain limit. In such cases as mixing pulverized coal and gasifying medium in their gasifying process, however, a high degree of uniformity in flow is required as regard to their mixing ratio. This precludes the use of ordinary apparatus, if an utmostly homogeneous flow of pulverized coal is to be obtained.

In fact, for perfect combustion of pulverized solid fuel, various apparatus have been designed and operated for mixing said fuel with air prior to sending the mixture into combustion zone, and, to this end, screw feeders have been used to supply the mixers with pulverized solid fuel. In such cases, flow velocity of the fuel discharged from the screw feeder varies synchronously with revolutions of said feeder, because of the variation in density and slip of the powdered substance contained in the screw feeder and the variation in the volume ratio of the space formed by the vane of a screw feeder, as well as due to interrelation between the direction of its discharge hole at the end of screw feeder and the screw axis. It is practically impossible to make the feeding speed of air for combustion follow such pulsative change in that of powdered solid fuel so as to keep the mixing ratio at a constant value.

On the other hand, in table feeders hitherto used to supply powdered substance, it has been impossible to eliminate fully the pulsation in discharge rate of powdered substance, since the discharge rate varies with the height of powder-filled bed within a hollow cylinder installed to guide the powdered substance to a rotary disk.

In the present invention, therefore, a device for giving rise to a continuous, pulsative flow of pulverized coal is combined with a table feeder provided with a fixed guide cylinder, with the lower edge of said cylinder gradually rising from a point of minimum clearance from the rotary disk in the direction of rotation of said disk and abruptly falling from its maximum height after a complete turn and joining said point, and an overflow step on the top of said cylinder located above the narrowest part of the discharge port formed between the lower edge of said cylinder and said rotary disk.

The object of this invention is to obtain uniform and steady flow of pulverized coal. Thus, the table feeder, constituting a main part of the apparatus of this invention, has the structure of its guide cylinder specially improved so that the outflow rate from said feeder of pulverized coal may have a constant value equivalent to the average value of inflow rate thereto. To this end, the fixed guide cylinder, forming a ring-form discharge port with the rotary disk of a table feeder, is constructed so that its lower edge will gradually rise from the lowest point in the direction of said rotary disk and suddenly fall after a complete turn from its maximum height to join said lowest point, with an overflow step located on the top of said cylinder above the narrowest part of said discharge port. When pulverized coal is sent into a cylinder of such construction, the surplus feed above the mean value of pulsative variation overflows the stepped part of the upper edge of the cylinder and falls directly onto the rotary disk, thereby enabling the height of the powder bed within the cylinder to be kept constant. Moreover, that part of pulverized coal fallen directly and deposited on the rotary disk is made to counteract the flow of pulverized coal pushed out of the discharge port so as to make the circumferential distribution of pulverized coal on the rotary disk uniform, thus permitting the deposits to be scraped continuously to form a highly uniform outflow.

Further explanations will be made referring to the accompanying drawings wherein.

Figure 1:
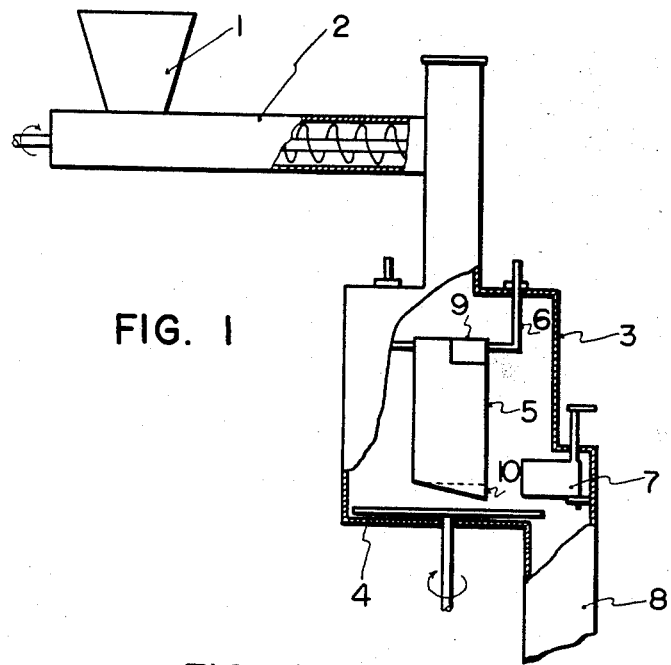
Figure 1 illustrates an embodiment of this invention.
Figure 2:
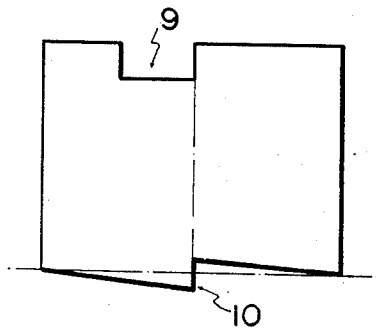
Figure 2 shows a developed form of a fixed cylinder in the apparatus of this invention.

Referring to Figure 1, pulverized coal is supplied from a hopper 1, and, through a screw feeder 2, falls into a fixed hollow cylinder 5. Then, passing through the cylinder 5, of which the developed form is shown in Figure 2, a greater part is discharged onto a rotary disk 4 as it rotates, through a discharge port 10 formed between the cylinder 5 and the disk 4. Simultaneously, the other part corresponding to the fluctuations of flow falling from the screw feeder 2 with velocities exceeding the mean value overflows a step 9, and, without passing through the cylinder 5, falls directly onto that locality of the disk 4 outside the narrowest portion of the discharge port 10. Uneven peripheral distribution of deposits which could otherwise occur is prevented by equilibrium of force between that part flowing out of the port 10 of varying width and that part fallen over the step 9 and deposited on the disk 4. Thus, pulverized coal scraped by a scraper 7 with a constant depth of insertion and thereafter outflow passing through a discharge pipe 8 becomes free from pulsative fluctuations.

Figure 3:
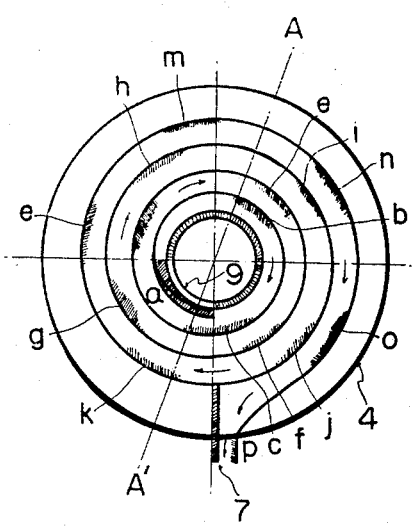
Figures 3 and 4 show the functions of the table feeder thereof, and Figure 5 cites the results of tests obtained in an embodiment of this invention.
Figure 4:
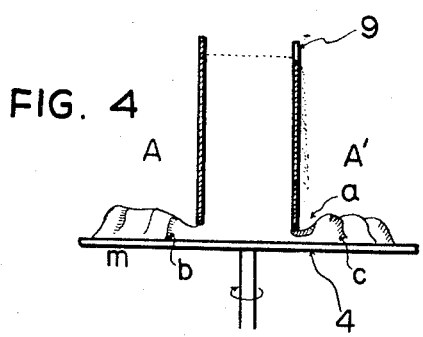

The reason that the distribution of deposits on the rotary disk is made even may be accounted for by using Figures 3 and 4 showing diagrammatically the mode of a pile of pulverized coal spreading over the rotary disk.

Indicated by a circinate line in Figure 3 is a pattern formed by a pile of pulverized coal discharged continuously from the port 10, while the shadowed parts a, b, c . . . show the locations of a portion of pulverized coal intermittently fallen over the step 9 and deposited on the rotary disk. Figure 4 shows a cross-section indicated by the A—A' line in Fig. 3. A portion of pulverized coal overflowing the stepped edge 9 and falling alongside the cylinder 5 is piled outside the discharge port 10 where the width thereof, hence the amount of powder discharged through that portion of the port 10, is a minimum, and its position is transferred as the disk 4 rotates, thus restricting the amount of powder being discharged from the successive parts of the port 10 with its width gradually increasing, by opposing such portions of powder trying to thrust outward. Thus, that portion of pulverized coal overflowing the outlet 9 not only serves to keep the height of powder-filled bed constant, but also adjusts the capacity of powdered material being discharged from its port 10, while being pushed outward and moving past positions in the order of a, b, c, . . ., so that the powder deposits spreading over the disk may become even along the peripheries of said disk.

In the apparatus of this invention, a supporter 6 of the guide cylinder 5 may be made movable vertically so as to enable regulation of the amount of the discharge of pulverized coal. Moreover, by making the inner surface of the guide cylinder rough, for example, by lining it with metal net, thereby increasing frictional resistance, the influence of vibrations which can possibly occur to the rotary disk and the fixed guide cylinder may be reduced.

Figure 5:
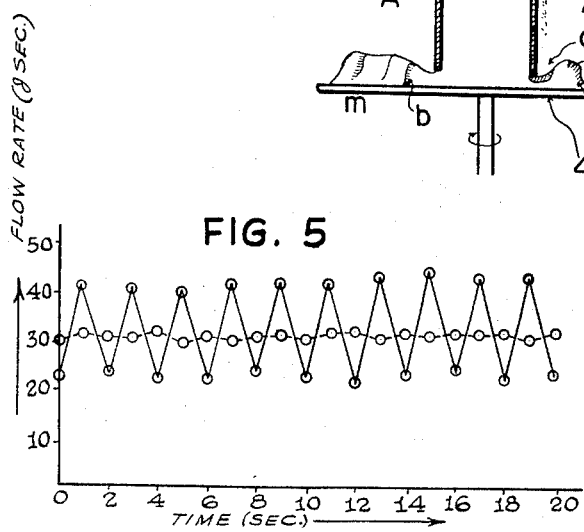

The degree of uniformity of flow attained by an apparatus according to this invention is illustrated in Figure 5, where the discharge rate from a screw feeder—indicated by an actual line—is compared with that from the table feeder of this invention combined with the same screw feeder—indicated by a chain line—against the lapse of time taken as one and the same abscissa, in this case the average diameter of coal particles having been 0.2 mm. It will be seen that the uniform flow resulting from an embodiment of this invention makes this apparatus suitable for use when, as in the mixing operation of the pulverized coal with gasifying medium for their gasification, a highly uniform flow for feeding pulverized coal is required.

We claim:

1. Apparatus for feeding pulverized coal comprising a screw feeding mechanism substantially horizontally disposed and having an end discharge opening, a rotary disk having a substantially vertical axis and positioned beneath said discharge opening, a fixed guide cylinder between said opening and disk and substantially coaxial with the latter, a scraper above a peripheral portion of said disk, said cylinder having a lower edge developed as a circular saw tooth edge and inclined upwardly in the direction of rotation of said disk, said cylinder having an upper edge provided with a recess beginning above the lowest portion of the lower edge and extending partially around the cylinder circumference.

2. The apparatus of claim 1 wherein said recess extends one quarter of the way around said cylinder circumference.

References Cited in the file of this patent

UNITED STATES PATENTS

| | | |
|---|---|---|
| 1,157,935 | Gray | Oct. 26, 1915 |
| 2,468,712 | Kohler | Apr. 26, 1949 |